United States Patent Office 3,554,872
Patented Jan. 12, 1971

3,554,872
PROCESS FOR SEPARATION OF 2,6-TOLYLENE DIISOCYANATE FROM ISOMERIC MIXTURES
Eugene Yue Chieh Chang and Samuel Kaizerman, Bridgewater Township, Somerset County, N.J., assignors to American Cyanamid Company, Stamford, Conn., a corporation of Maine
No Drawing. Continuation-in-part of application Ser. No. 526,393, Feb. 10, 1966. This application July 24, 1968, Ser. No. 747,105
Int. Cl. B01d 3/34; C07c 119/04
U.S. Cl. 203—38                                4 Claims

ABSTRACT OF THE DISCLOSURE

A process for separating 2,6-tolylene diisocyanate from a mixture containing 2,4-tolylene diisocyanate and at least 10% of 2,6-tolylene diisocyanate by (1) reacting said mixture with a hydroxyl-terminated polyester or polyether and (2) subsequently vacuum distilling to obtain pure 2,6-tolylene diisocyanate or an isomer mixture richer in this component than was the starting material.

---

This application is a continuation-in-part of Ser. No. 526,393, filed Feb. 10, 1966, and now abandoned.

This invention relates to a process for separating 2,6-tolylene diisocyanate from 2,4-tolylene diisocyanate. More particularly, it relates to a process of (1) reacting an excess of mixed 2,4- and 2,6-isomers of tolylene diisocyanate with a hydroxyl-containing compound and (2) subsequently distilling the reaction mixture, thereby obtaining pure 2,6-tolylene diisocyanate or an isomeric mixture richer in this component than was the starting mixture.

According to the mode of preparation, tolylene diisocyanate (TDI) is commercially available in three variations, vis: a pure 2,4-TDI; a mixture of 80% 2,4- and 20% 2,6-isomers; and a mixture of 65% 2,4- and 35% 2,6-isomers. TDI of high 2,6-isomer content, as well as the pure 2,6-isomer, has been extremely scarce even in research quantities because separation by known physical methods is virtually impossible and preparation of the 2,6-isomer through conventional routes is exceedingly tedious and impractical.

It has now been discovered that pure 2,6-TDI and isomeric mixtures rich in this component (i.e., containing more than 50% of 2,6-TDI) can be obtained by adding in limited amounts, a hydroxyl-terminated polyester or polyether to the isomeric mixture, effecting reaction of the 2,4-isomer of TDI with said polyester or polyether to the exclusion or near-exclusion of reaction by the 2,6-isomer and recovering, by vacuum distillation from the reaction mixture, unreacted TDI that is either the pure 2,6-isomer or an isomeric mixture greatly enriched in this component over the starting mixture. The process may be repeated a second time, if desired, employing an enriched isomeric mixture as the starting isocyanate and recovering unreacted DTI either as the pure 2,6-isomer or as an isomeric mixture further enriched in 2,6-TDI content. This invention thus makes excellent use of the different rates of reactivity of the two isomeric forms of tolylene diisocyanate.

It is highly surprising that a high degree of enrichment, and even pure 2,6-TDI, is obtained so effectively and so readily.

The discovery makes available pure 2,6-TDI and isomeric mixtures rich in this component to an extent where technological development of such materials, hitherto unavailable to the required extent, is possible. The properties of polyurethane elastomers containing major amounts of 2,6-TDI make them highly desirable for many uses and provide advantages over similar elastomers containing major amounts of 2,4-TDI in particular uses.

A further advantage of the process relates to the formation of the high 2,4-TDI content polyurethane prepolymer as the other component separated by the vacuum distillation of the reaction product of mixed TDI isomers and hydroxyl-terminated polyester or polyether. This prepolymer is low melting and therefore easily removable from unreacted 2,6-TDI by the distillation. If the non-polymeric secondary or tertiary aliphatic alcohols of U.S. Pat. 3,022,328 are used in the process in the place of the hydroxyl-terminated polyesters or polyethers, the prepolymers resulting from reaction step (1) are high melting and tend to solidify. Consequently, distillation step (2) is made extremely difficult since the apparatus tends to clog with crystallized prepolymer particularly when the preferred thin film evaporator distillation apparatus is employed.

In carrying out the process of the present invention, it is necessary to use as a starting material an isomeric mixture of TDI, wherein at least some of the 2,6-isomer is present along with the 2,4-isomer. While normally the commercially available isomeric mixtures, which contain from 20 to 35% of 2,6-TDI and the balance 2,4-TDI, are employed as starting materials, restriction to such mixtures is not implied, since mixtures of other contents are possible. A mixture greatly enriched in 2,6-isomer content, as produced by the process of this invention, may be employed as a starting material. For practical purposes, however, it is desirable to employ as a starting material an isomeric mixture of TDI containing at least 10% of the 2,6-isomer. The upper limit of content of 2,6-isomer in the mixture may be just under 100% and is only limited to that concentration beyond which further enrichment is neither necessary nor desirable.

The hydroxyl-terminated polyesters and hydroxyl-terminated polyethers employed in the process have a molecular weight of at least about 500 and normally less than about 5,000. A preferred range is from about 1,000 to about 2,000. The polyesters are the condensation products of aliphatic diols of about 2–10 carbon atoms and dicarboxylic acids of about 2–8 carbon atoms in each alkylene chain. The alkylene linkages in both the polyesters and polyethers may be either straight or branched chain.

The polyesters include those prepared from (1) glycols such as ethylene glycol, 1,2-propanediol, 1,3-propanediol, 1,4-butanediol, decamethylene glycol, and the like, and mixtures thereof, and (2) dicarboxylic acids, such as succinic acid, glutaric acid, adipic acid, pimelic acid, suberic acid, azelaic acid, sebacic acid, and the like, and mixtures thereof. A preferred polyester is poly(ethylene adipate).

The polyethers include poly(ethylene glycol), poly(propylene glycol), poly(tetramethylene glycol), poly(1,2-dimethylethyleneglycol), and mixtures thereof. A preferred polyether is poly(propylene glycol).

The number of equivalents of the hydroxyl-terminated polyester or polyether employed is less than that required for complete reaction with all of the isocyanate groups present, and, however, is in excess of the requirements for reaction with at least one isocyanate group of the 2,4-TDI.

The reaction of the hydroxyl-terminated polyester or polyether and isocyanate may be carried out at from 0° to 120° C., preferably from 25° to 100° C. The time required for complete reaction will vary widely with temperature as well as the nature of the polyester or polyether. In most instances, times of from 2 to 48 hours are satisfactory.

After reaction of the hydroxyl-terminated polyester or polyether and the isocyanate, the unreacted TDI is removed by distillation, preferably at reduced pressure and at a temperature below about 150° C. The preferred reduced pressure is below the equivalent of 5 mm. of mercury. The distillate obtained in this manner will be pure 2,6-TDI or an isomeric mixture of 2,4- and 2,6-TDI that is richer in the 2,6-isomer than was the starting material. The use of a continuously operated thin film evaporator is a preferred though not a necessary distillation technique. This apparatus and its use are disclosed in U.S. Pat. 3,183,112.

The distillate as obtained may be employed in producing polyurethane elastomers containing major amounts of the 2,6-isomer of TDI or may be recycled through the enrichment process a number of times so as to obtain isomer mixtures of TDI further enriched in the content of 2,6-isomer or to obtain pure 2,6-TDI.

In order to illustrate the present invention more fully, the following non-limiting examples are given in which all parts and percentages are by weight unless otherwise indicated.

EXAMPLE 1

A commercial mixture of isomers of tolylene diisocyanate was employed as the source of 2,6-tolylene diisocyanate. This mixture contained 20% of 2,6-isomer and 80% of 2,4-isomer. 56.7 kilograms (326 mols) of the mixture having 11.3 kilograms (66 mols) of the 2,6-isomer and 45.4 kilograms of 2,4-isomer, were treated with 191 kilograms of a hydroxyl-terminated poly(ethylene adipate) of 1,230 molecular weight and a hydroxyl content of 155 mols. The reaction was initiated at 60° C. and the temperature was gradually raised to 100° C. during a period of four hours with reaction being completed in 5.5 hours. The reaction mixture was then distilled using a thin-film rotary evaporator. The distillation temperature ranged from 130–150° C. at a pressure equivalent to 1 mm. of mercury. The distillate, 9.9 kilograms (56.9 mols), upon analysis by nuclear-magnetic resonance was found to contain 67.6% 2,6-TDI and 32.4% 2,4-TDI.

EXAMPLE 2

The distillate of Example 1 (1217 grams, 7 mols) was reacted with 2000 grams (2 mols) of a poly(propylene glycol) of molecular weight 1000 at 25–30° C. for 48 hours. Upon distillation as in Example 1, there was obtained 410 grams of 2,6-tolylene diisocyanate of 99% purity.

EXAMPLE 3

The distillate of Example 1 (522 grams, 3 mols) was reacted with 1050 grams (1.05 mols) of poly(propylene glycol) of molecular weight 1000 under the conditions stated in Example 2. Upon distillation as in Example 1, there was obtained 155 grams of pure 2,6-tolylene diisocyanate.

What is claimed is:

1. A method for producing products of high 2,6-tolylene diisocyanate content from tolylene diisocyanate mixtures of lower 2,6-isomeric content, which comprises reacting at from 0° C. to 120° C. an isomeric mixture of tolylene diisocyanate containing at least 10% of the 2,6-isomer, with a hydroxyl-containing compound of molecular weight of at least about 500 selected from the group consisting of a hydroxyl-terminated polyester or a hydroxyl-terminated polyether and thereafter recovering tolylene diisocyanate enriched in 2,6-isomer content as compared with the starting material, by vacuum distillation of the reaction product at below about 150° C., wherein the polyester is a condensation product of an aliphatic diol of about 2–10 carbon atoms and a dicarboxylic acid of about 2–8 carbon atoms in each alkylene chain, and the polyether is based on polyalkylene ($C_2$–$C_4$) glycols, and wherein the amount of hydroxyl-containing compound present is less than stoichiometric requirements for the total amount of tolylene diisocyanate present but is in excess of the requirements for reaction with at least one isocyanate group of the 2,4-isomer.

2. The process of claim 1 wherein vacuum distillation is carried out at a pressure not in excess of 5 mm. of mercury.

3. The process of claim 1 wherein the hydroxyl-containing compound is poly(ethylene adipate).

4. The process of claim 1 wherein the hydroxyl-containing compound is poly(propylene glycol).

References Cited

UNITED STATES PATENTS 3,022,328   2/1962   Cobb _____ 260—453

CHARLES B. PARKER, Primary Examiner

D. H. TORRENCE, Assistant Examiner

U.S. Cl. X.R.

203—60, 63, 64, 89, 91; 260—77.5, 453, 471